(12) United States Patent
Kim et al.

(10) Patent No.: US 11,018,412 B2
(45) Date of Patent: May 25, 2021

(54) ANTENNA MODULE SUPPORTING DUAL BANDS AND ELECTRONIC DEVICE INCLUDING THE SAME

(71) Applicant: Samsung Electronics Co., Ltd., Gyeonggi-do (KR)

(72) Inventors: Jihoon Kim, Gyeonggi-do (KR); Junghwan Son, Gyeonggi-do (KR); Chaejun Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/804,805

(22) Filed: Feb. 28, 2020

(65) Prior Publication Data

US 2020/0321686 A1    Oct. 8, 2020

(30) Foreign Application Priority Data

Feb. 28, 2019   (KR) .......................... 10-2019-0023866

(51) Int. Cl.
  *H01Q 1/24*   (2006.01)
  *H01Q 5/30*   (2015.01)
  (Continued)

(52) U.S. Cl.
  CPC ................ *H01Q 1/24* (2013.01); *H01Q 1/38* (2013.01); *H01Q 5/30* (2015.01); *H01Q 1/273* (2013.01)

(58) Field of Classification Search
  CPC .. H01Q 1/24; H01Q 5/30; H01Q 1/38; H01Q 1/273
  (Continued)

(56) References Cited

U.S. PATENT DOCUMENTS 5,768,691 A * 6/1998 Matero .................... H01Q 1/24
                                                                                333/101
6,897,812 B2   5/2005 Huang
(Continued)

FOREIGN PATENT DOCUMENTS

CN         1934750         3/2007
CN       104335420         2/2015
(Continued)

OTHER PUBLICATIONS

International Search Report dated Jun. 23, 2020 issued in counterpart application No. PCT/KR2020/002874, 3 pages.
(Continued)

*Primary Examiner* — Lee Nguyen
(74) *Attorney, Agent, or Firm* — The Farrell Law Firm, P.C.

(57) ABSTRACT

An electronic device including a housing; a display; a wireless communication circuit comprising a first port, a second port, a third port, and a fourth port, wherein the wireless communication circuit is configured to transmit a first signal having a first frequency via the first port; receive a second signal having the first frequency via the second port; transmit a third signal having a second frequency different from the first frequency via the third port; and receive a fourth signal having the second frequency via the fourth port; and an antenna structure disposed inside the housing, wherein the antenna structure comprises: a conductive pattern; a first node, a second node, and a third node electrically connected to the conductive pattern; a first electrical path; a second electrical path; a third electrical path; a fourth electrical path; a fifth electrical path; a sixth electrical path; and a seventh electrical path.

20 Claims, 13 Drawing Sheets

(51) Int. Cl.
*H01Q 1/38* (2006.01)
*H01Q 1/27* (2006.01)

(58) Field of Classification Search
USPC ............... 455/575.7; 343/905–906, 700 MS
See application file for complete search history.

(56) References Cited

U.S. PATENT DOCUMENTS

| | | | |
|---|---|---|---|
| 7,193,562 | B2 | 3/2007 | Shtrom et al. |
| 7,292,198 | B2 | 11/2007 | Shtrom et al. |
| 8,102,330 | B1 | 1/2012 | Albers |
| 8,816,913 | B2 | 8/2014 | Rhyu et al. |
| 9,647,703 | B2 | 5/2017 | Sun et al. |
| 9,905,934 | B2 | 2/2018 | Wang et al. |
| 10,038,246 | B2 | 7/2018 | Feng et al. |
| 10,224,977 | B2 | 3/2019 | Sun et al. |
| 10,439,267 | B2 | 10/2019 | Seo et al. |
| 10,498,039 | B2 | 12/2019 | Feng et al. |
| 10,623,046 | B2 | 4/2020 | Sun et al. |
| 10,693,506 | B2 | 6/2020 | Kim et al. |
| 2004/0160368 | A1 | 8/2004 | Huang |
| 2010/0053023 | A1 | 3/2010 | Shtrom et al. |
| 2011/0175789 | A1* | 7/2011 | Lee .................. H01Q 5/20 343/853 |
| 2012/0105286 | A1 | 5/2012 | Rhyu et al. |
| 2014/0056371 | A1 | 2/2014 | Ji et al. |
| 2016/0080012 | A1 | 3/2016 | Sun et al. |
| 2017/0012358 | A1 | 1/2017 | Feng et al. |
| 2018/0124575 | A1 | 5/2018 | Kish et al. |
| 2018/0175500 | A1 | 6/2018 | Thoreback |
| 2018/0175916 | A1 | 6/2018 | Rowell |
| 2018/0198212 | A1 | 7/2018 | Rodriguez |
| 2018/0337457 | A1 | 11/2018 | Feng et al. |
| 2018/0337697 | A1 | 11/2018 | Kim et al. |
| 2019/0198995 | A1 | 6/2019 | Ryoo et al. |
| 2020/0091608 | A1 | 3/2020 | Alpman et al. |

FOREIGN PATENT DOCUMENTS

| | | |
|---|---|---|
| CN | 105633555 | 6/2016 |
| CN | 205846235 | 12/2016 |
| CN | 108291930 | 7/2018 |
| CN | 1081331039 | 10/2018 |
| KR | 2012-0128976 | 11/2012 |
| KR | 10-1939047 | 1/2019 |
| WO | WO 2018/119153 | 6/2018 |

OTHER PUBLICATIONS

European Search Report dated Jul. 17, 2020 issued in counterpart application No. 20159813.3-1205, 7 pages.
Chinese Office Action dated Apr. 6, 2021 issued in counterpart application No. 202010133464.5, 13 pages.

* cited by examiner

ANTENNA MODULE SUPPORTING DUAL BANDS AND ELECTRONIC DEVICE INCLUDING THE SAME

CROSS-REFERENCE TO RELATED APPLICATION(S)

This application is based on and claims priority under 35 U.S.C. § 119 to Korean Patent Application No. 10-2019-0023866, filed on Feb. 28, 2019, in the Korean Intellectual Property Office, the disclosure of which is incorporated by reference herein its entirety.

BACKGROUND

1. Field

The disclosure relates to an antenna module supporting dual bands and an electronic device including the same.

2. Description of Related Art

As mobile communication technologies develop, an electronic device equipped with an antenna, such as a smartphone or a wearable device, is being widely supplied. An electronic device may receive or transmit a signal including data (e.g., a message, a photo, a video, a music file, or a game) through an antenna.

An antenna module of an electronic device may be implemented using a plurality of antenna elements to receive or transmit a signal more efficiently. For example, an electronic device may include one or more antenna arrays in each of which a plurality of antenna elements are arranged in a regular shape. An antenna array may have an effective isotropically radiated power (EIRP) greater than one antenna element.

In 5G mobile communication, for the purpose of improving data throughput, a wireless signal in a relatively high frequency band may be used as compared to 4G mobile communication. Furthermore, in 5G mobile communication, an electronic device may support dual bands to efficiently use radio resources. For example, an electronic device may be configured to support a first band (e.g., a band of about 26 GHz or more but less than about 30 GHz) and a second band (e.g., a band of about 37 GHz or more but less than about 40 GHz). In this case, an electronic device may include a transmission/reception path for a first band and a transmission/reception path for a second band at least partly different from the first band, due to a frequency characteristic of a power amplifier.

To support dual bands, a plurality of transmission and reception paths may be electrically connected to a single antenna element. In 5G mobile communication, an electronic device may perform wireless communication depending on a time division multiplexing scheme. In this case, an electronic device may switch a single antenna element so as to be connected to a transmission path or a reception path depending on a configuration of wireless resources. Moreover, an electronic device may switch a single antenna element so as to be associated with a first frequency band or a second frequency band.

For switching transmission and reception paths associated with an antenna element, an electronic device may use a switching element or a switching circuit. When a switching element or a switching circuit is used, the performance of an antenna may degrade due to the switching element or the switching circuit. For example, an insertion loss may occur due to a switching element or a switching circuit. In addition, due to a switching element or a switching circuit, system complexity of an antenna module may increase and linearity of the antenna module may degrade.

SUMMARY

In accordance with an aspect of the disclosure, an electronic device is provided. The electronic device includes a housing including a first plate, a second plate facing away from the first plate, and a side member surrounding a space between the first plate and the second plate and coupled with the second plate or integrally formed with the second plate, a display exposed through at least part of the first plate, a wireless communication circuit including a first port, a second port, a third port, and a fourth port, wherein the wireless communication circuit is configured to transmit a first signal having a first frequency via the first port; receive a second signal having the first frequency via the second port; transmit a third signal having a second frequency different from the first frequency via the third port; and receive a fourth signal having the second frequency via the fourth port; and an antenna structure disposed inside the housing, wherein the antenna structure includes a conductive pattern, a first node, a second node, and a third node electrically connected to the conductive pattern, a first electrical path extending between the first port and the first node and having a first length that is an odd multiple of ¼ of a first wavelength of the first signal, a second electrical path extending between the second port and the first node and having the first length, a third electrical path extending between the third port and the second node and having a second length that is an odd multiple of ¼ of a second wavelength of the second signal, a fourth electrical path extending between the fourth port and the second node and having the second length, a fifth electrical path extending between the first node and the third node and having a third length, wherein a sum of the first length and the third length is an odd multiple of ¼ of the second wavelength, a sixth electrical path extending between the second node and the third node and having a fourth length, wherein a sum of the second length and the fourth length is an odd multiple of ¼ of the first wavelength, and a seventh electrical path electrically connected between the third node and the conductive pattern.

In accordance with another aspect of the disclosure, an antenna module is provided. The antenna module includes a wireless communication circuit including a first port, a second port, a third port, and a fourth port, wherein the wireless communication circuit is configured to transmit a first signal having a first frequency via the first port, receive a second signal having the first frequency via the second port, transmit a third signal having a second frequency different from the first frequency via the third port, and receive a fourth signal having the second frequency via the fourth port, and a printed circuit board in which a conductive pattern is formed on a first surface and in which the wireless communication circuit is positioned on a second surface facing away from the first surface, wherein the printed circuit board includes a first node, a second node, and a third node electrically connected to the conductive pattern, a first electrical path extending between the first port and the first node and having a first length that is an odd multiple of ¼ wavelength of a first wavelength of the first signal, a second electrical path extending between the second port and the first node and having the first length, a third electrical path extending between the third port and the second node and having a second length that is an odd multiple of ¼ wavelength of a second wavelength of the second signal, a fourth electrical path extending between the fourth port and the second node and having the second length, a fifth electrical path extending between the first node and the third node and having a third length, wherein a sum of the first length and the third length is an odd multiple of ¼ wavelength of the second wavelength, a sixth electrical path extending between the second node and the third node and having a fourth length, wherein a sum of the second length and the fourth length is an odd multiple of ¼ wavelength of the first wavelength, and a seventh electrical path electrically connected between the third node and the conductive pattern.

BRIEF DESCRIPTION OF THE DRAWINGS

The above and other aspects, features, and advantages of certain embodiments of the present disclosure will be more apparent from the following description, taken in conjunction with the accompanying drawings, in which.

DETAILED DESCRIPTION

Hereinafter, various embodiments of the disclosure are described with reference to the accompanying drawings. The embodiments and terms used with regard to the embodiments are not intended to limit the present disclosure, but should be understood to include various modifications, equivalents, and/or alternatives of the disclosure.

Figure 1:
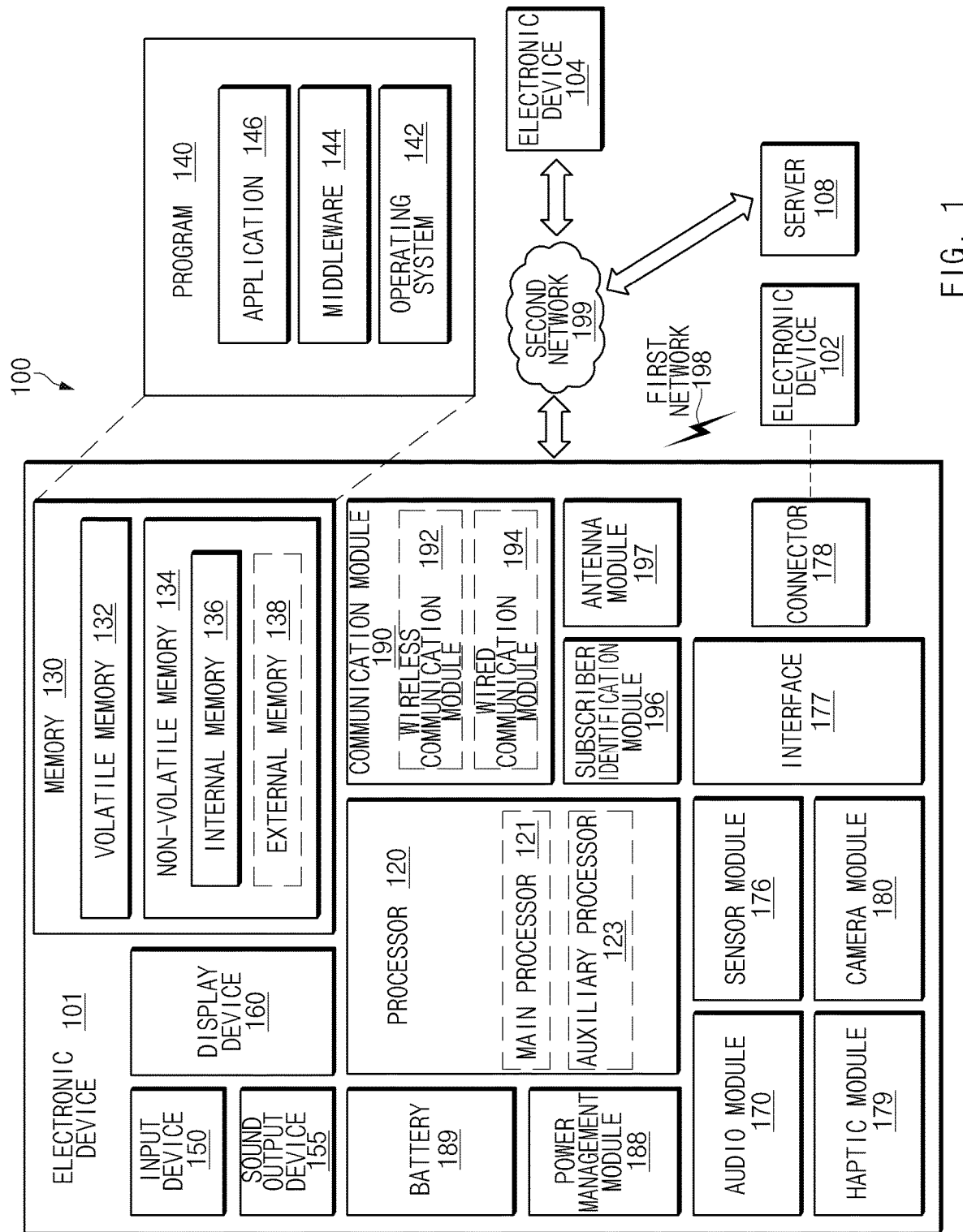
FIG. 1 is a block diagram of an electronic device in a network, according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., an RFIC) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory storage medium" means a tangible device, and does not include a signal (e.g., an electromagnetic wave), but this term does not differentiate between where data is semi-permanently stored in the storage medium and where the data is temporarily stored in the storage medium. For example, "the non-transitory storage medium" may include a buffer where data is temporally stored.

A method according to various embodiments of the disclosure may be included and provided in a computer program product. The computer program product may be traded as a product between a seller and a buyer. The computer program product (e.g., downloadable app)) may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
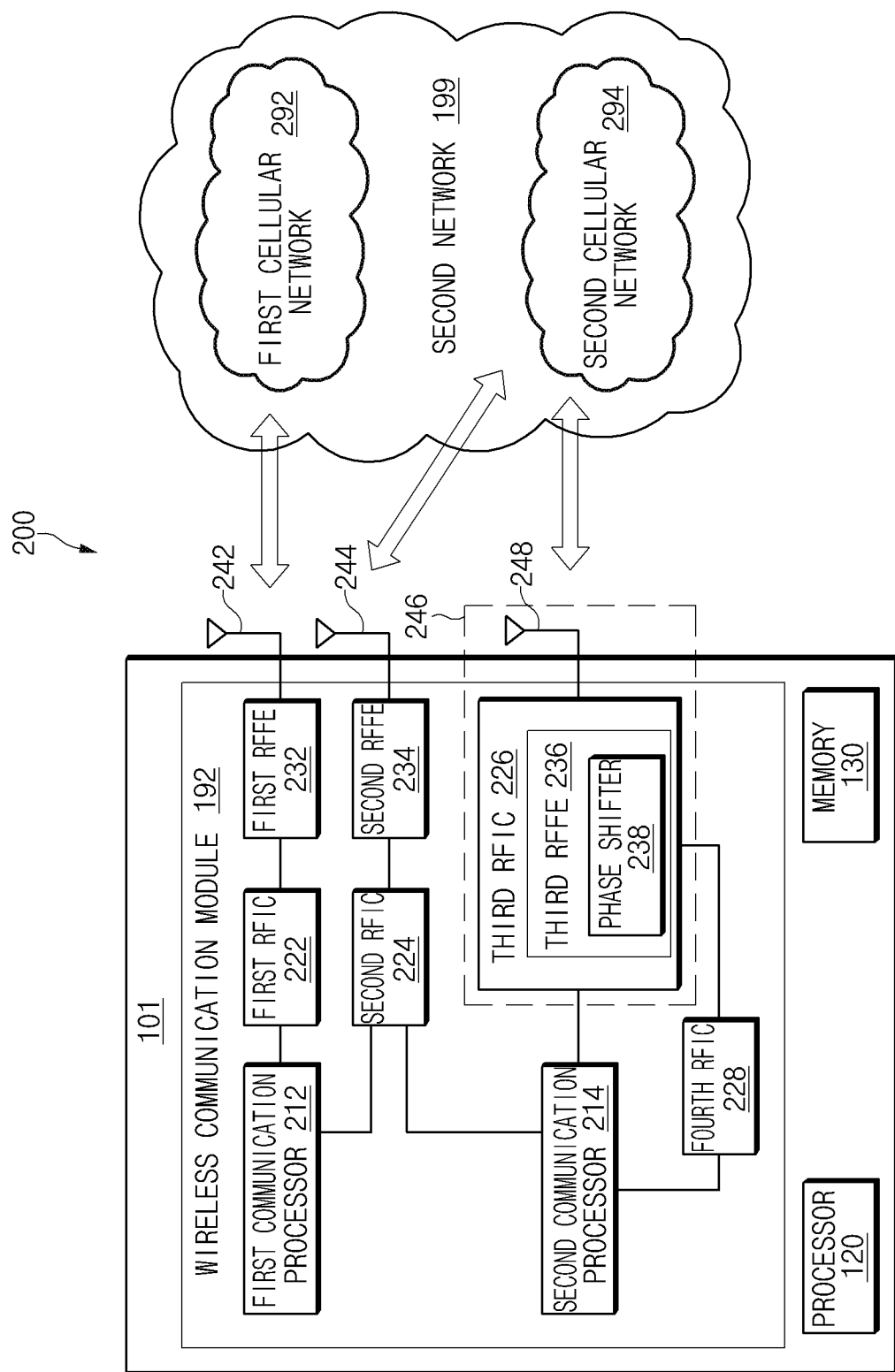
FIG. 2 is a block diagram of an electronic device for supporting legacy network communication and 5G network communication, according to an embodiment.

FIG. 2 is a block diagram 200 of the electronic device 101 for supporting legacy network communication and 5G network communication, according to an embodiment.

Referring to FIG. 2, the wireless communication module 192 in the electronic device 101 may include a first communication processor 212, a second communication processor 214, a first RFIC 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first cellular network 292 and a second cellular network 294. The electronic device 101 may further include at least one of the components described above with reference to FIG. 1, and the second network 199 may include at least one other network. The first communication processor 212, the second communication processor 214, the first RFIC 222, the second RFIC 224, the fourth RFIC 228, the first RFFE 232, and the second RFFE 234 may form at least part of the wireless communication module 192. The fourth RFIC 228 may be omitted or included as a part of the third RFIC 226.

The first communication processor 212 may support the establishment of a communication channel of a band to be used for wireless communication with the first cellular network 292 and a legacy network communication through the established communication channel. The first cellular network 292 may be a legacy network including a 2G, a 3G, a 4G, and/or a long term evolution (LTE) network. The second communication processor 214 may support the establishment of a communication channel corresponding to a specified band (e.g., about 6 GHz—about 60 GHz) among bands to be used for wireless communication with the second cellular network 294 and 5G network communication via the established communication channel. The second cellular network 294 may be a 5G network defined in 3GPP. Additionally, the first communication processor 212 or the second communication processor 214 may establish a communication channel for a specified band (e.g., about 6 GHz or lower) of the bands to be used for wireless communication with the second cellular network 294 and may support 5G network communication through the established communication channel. The first communication processor 212 and the second communication processor 214 may be implemented within a single integrated circuit or chip or a single package. The first communication processor 212 or the second communication processor 214 may be implemented within a single chip or a single package with the processor 120, the auxiliary processor 123 of FIG. 1, or the communication module 190.

At the time of transmission, the first RFIC 222 may convert a baseband signal generated by the first communication processor 212 to a radio frequency (RF) signal of about 700 MHz to about 3 GHz used for the first cellular network 292 (e.g., a legacy network). At the time of reception, the RF signal may be obtained from the first cellular network 292 (e.g., a legacy network) via an antenna (e.g., the first antenna module 242) and may be preprocessed via the first RFFE 232. The first RFIC 222 may convert the preprocessed RF signal to a baseband signal so as to be processed by the first communication processor 212.

In the case of transmitting a signal, the second RFIC 224 may convert a baseband signal generated by the first communication processor 212 or the second communication processor 214 into an RF signal (e.g., a 5G Sub6 RF signal) in a Sub6 band (e.g., about 6 GHz or lower) used in the second cellular network 294 (e.g., a 5G network). At the time of reception, the 5G Sub6 RF signal may be obtained from the second cellular network 294 (e.g., a 5G network) via an antenna (e.g., the second antenna module 244) and may be preprocessed via the second RFFE 234. The second RFIC 224 may convert the preprocessed 5G Sub6 RF signal to a baseband signal so as to be processed by a communication processor corresponding to the first communication processor 212 or the second communication processor 214.

At the time of transmission, the third RFIC 226 may convert a baseband signal generated by the second communication processor 214 to an RF signal (e.g., a 5G Above6 RF signal) of a 5G Above6 band (e.g., about 6 GHz-about 60 GHz) to be used for the second cellular network 294 (e.g., a 5G network). At the time of reception, the 5G Above6 RF signal may be obtained from the second cellular network 294 (e.g., a 5G network) via an antenna (e.g., the antenna 248) and may be preprocessed via a third RFFE 236. For example, the third RFFE 236 may perform preprocessing of a signal, using a phase shifter 238. The third RFIC 226 may convert the preprocessed 5G Above6 RF signal to a baseband signal so as to be processed by the second communication processor 214. The third RFFE 236 may be formed as part of the third RFIC 226.

The electronic device 101 may include the fourth RFIC 228 independent of the third RFIC 226 or as at least part thereof. In this case, the fourth RFIC 228 may convert the baseband signal generated by the second communication processor 214, to an RF signal (e.g., an intermediate frequency (IF) signal) of an intermediate frequency band (e.g., about 9 GHz—about 11 GHz) and then may transmit the IF signal to the third RFIC 226. The third RFIC 226 may convert the IF signal to the 5G Above6 RF signal. At the time of reception, the 5G Above6 RF signal may be received from the second cellular network 294 (e.g., a 5G network) via an antenna (e.g., the antenna 248) and converted to the IF signal by the third RFIC 226. The fourth RFIC 228 may convert the IF signal to the baseband signal such that the second communication processor 214 is capable of processing the baseband signal.

The first RFIC 222 and the second RFIC 224 may be implemented as at least part of a single chip or a single package. The first RFFE 232 and the second RFFE 234 may be implemented as at least part of a single chip or a single package. At least one antenna module of the first antenna module 242 or the second antenna module 244 may be omitted or may be coupled to another antenna module and then may process RF signals of a plurality of corresponding bands.

The third RFIC 226 and the antenna 248 may be disposed on the same substrate to form the third antenna module 246. For example, the wireless communication module 192 or the processor 120 may be disposed on a first substrate (e.g., a main PCB). In this case, the third RFIC 226 may be disposed in a partial region (e.g., a bottom surface) of a second substrate (e.g., a sub PCB) separately of the first substrate; the antenna 248 may be disposed in another partial region (e.g., an upper surface), and, thus, the third antenna module 246 may be formed. For example, the antenna 248 may include an antenna array capable of being used for beamforming. It is possible to reduce the length of the transmission line between the third RFIC 226 and the antenna 248 by positioning the third RFIC 226 and the antenna 248 on the same substrate. The decrease in the transmission line may make it possible to reduce the loss (or attenuation) of a signal in a high-frequency band (e.g., approximately 6 GHz to approximately 60 GHz) used for the 5G network communication due to the transmission line. For this reason, the electronic device 101 may improve the quality or speed of communication with the second cellular network 294 (e.g., a 5G network).

The second cellular network 294 (e.g., a 5G network) may be used independently of the first cellular network 292 (e.g., a legacy network) (e.g., stand-alone (SA)) or may be used in conjunction with the first cellular network 292 (e.g., non-stand alone (NSA)). For example, only an access network (e.g., a 5G radio access network (RAN) or a next generation RAN (NG RAN)) may be present in the 5G network, and a core network (e.g., a next generation core (NGC)) may be absent from the 5G network. In this case, the electronic device 101 may access the access network of the 5G network and may then access an external network (e.g., the Internet) under control of the core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130 so as to be accessed by another component (e.g., the processor 120, the first communication processor 212, or the second communication processor 214).

Figure 3:
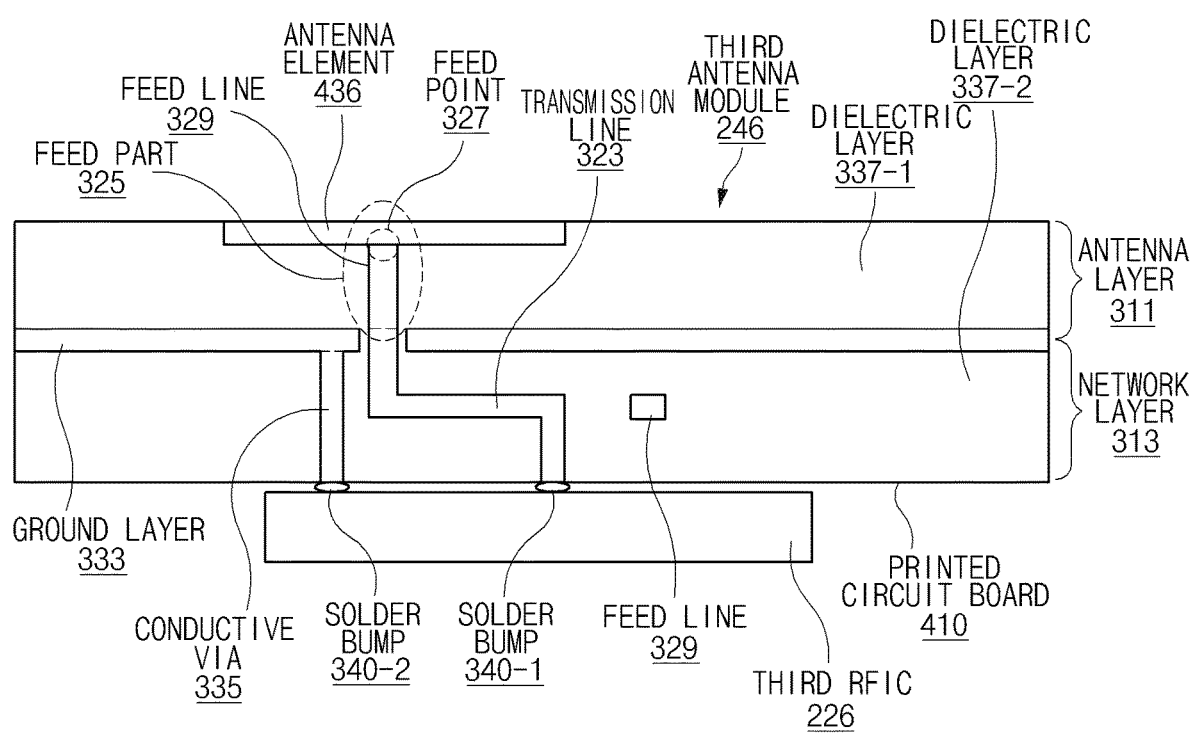
FIG. 3 is a cross-sectional view of a third antenna module taken along a line 3-3 of FIG. 4.
Figure 4:
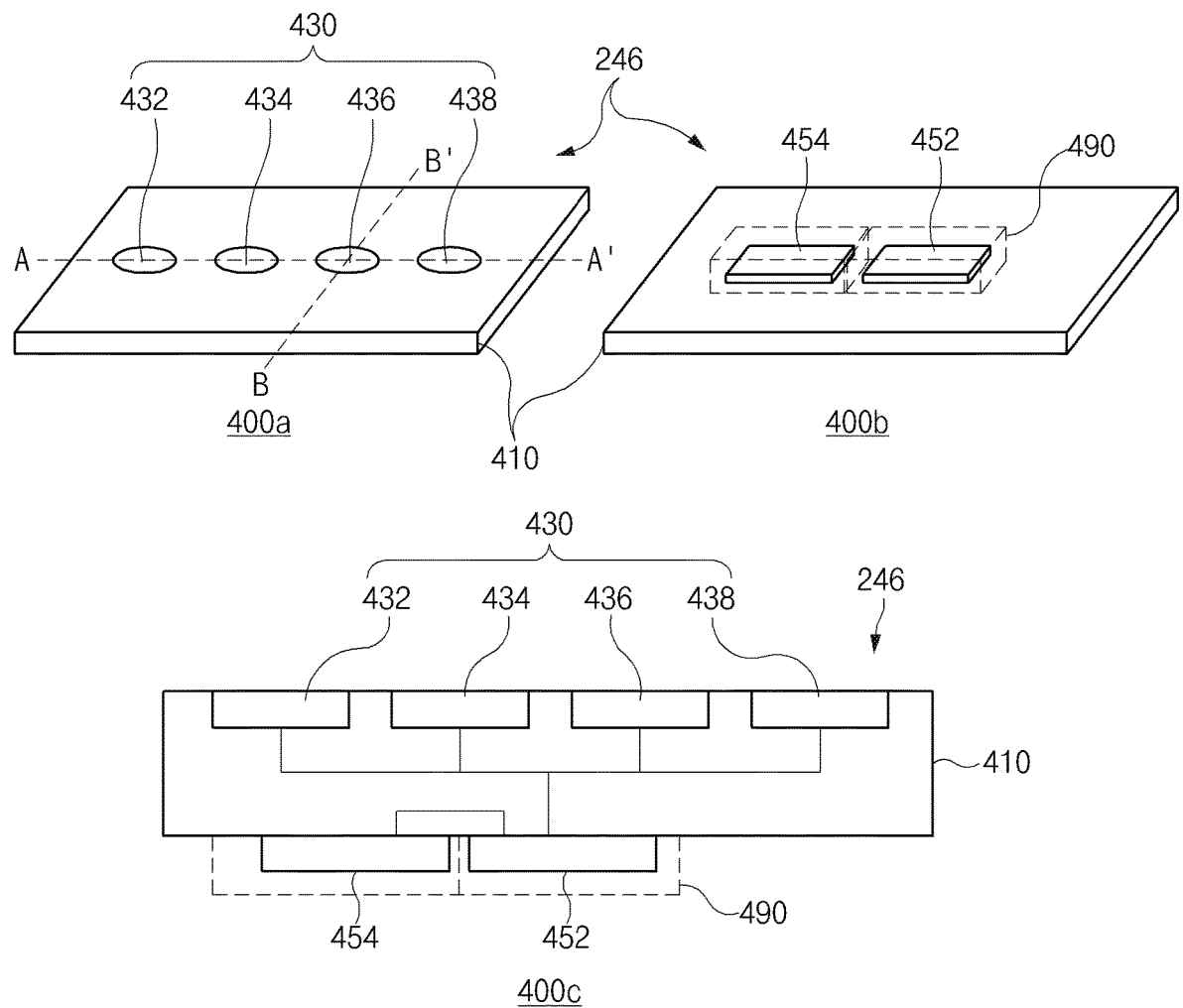
FIG. 4 is various perspective views of the third antenna module of FIG. 2.

FIG. 3 illustrates a cross-sectional view of the third antenna module 246 taken along a line B-B' 400*a* of FIG. 4.

Referring to FIG. 3, a PCB 410 may include an antenna layer 311 and a network layer 313.

The antenna layer 311 may include at least one dielectric layer 337-1, and an antenna element 436 and/or a feed part 325 formed on an outer surface of the dielectric layer 337-1 or therein. The feed part 325 may include a feed point 327 and/or a feed line 329.

The network layer 313 may include at least one dielectric layer 337-2 and at least one ground layer 333, at least one conductive via 335, and/or a transmission line 323 formed on an outer surface of the dielectric layer 337-2 or therein.

In addition, the third RFIC 226 may be electrically connected with the network layer 313, for example, through first solder bump 340-1 and the second solder bump 340-2. Various connection structures (e.g., soldering or a ball grid array (BGA)) may be utilized instead of the first solder bump 340-1 and the second solder bump 340-2. The third RFIC 226 may be electrically connected with the antenna element 436 through the first solder bump 340-1, the transmission line 323, and the feed part 325. In addition, the third RFIC 226 may be electrically connected with the ground layer 333 through the second solder bump 340-2 and the conductive via 335.

FIG. 4 illustrates an embodiment of the third antenna module 246 described with reference to FIG. 2, for example. 400*a* of FIG. 4 is a perspective view of the third antenna module 246 when viewed from one side, and 400*b* of FIG. 4 is a perspective view of the third antenna module 246 when viewed from another side. 400*c* of FIG. 4 is a cross-sectional view of the third antenna module 246 taken along a line A-A'.

Referring to FIG. 4, the third antenna module 246 may include a PCB 410, an antenna array 430, RFIC 452, a power manage integrated circuit (PMIC) 454, and/or a module interface. Selectively, the third antenna module 246 may further include a shielding member 490. At least one of the above components may be omitted, or at least two of the components may be integrally formed.

The PCB 410 may include a plurality of conductive layers and a plurality of non-conductive layers, and the conductive layers and the non-conductive layers may be alternately stacked. The PCB 410 may provide electrical connection with various electronic components disposed on the PCB 410 or on the outside, using wires and conductive vias formed in the conductive layers.

The antenna array 430 may include a plurality of antenna elements 432, 434, 436, and 438 disposed to form a directional beam. The antenna elements 432, 434, 436, and 438 may be formed on a first surface of the PCB 410. The antenna array 430 may be formed within the PCB 410. The antenna array 430 may include a plurality of antenna arrays (e.g., a dipole antenna array and/or a patch antenna array), the shapes or kinds of which are identical or different.

The RFIC 452 may be disposed on another region (e.g., a second surface facing away from the first surface) of the PCB 410 so as to be spaced from the antenna array 430. The RFIC 452 may be configured to process a signal in the selected frequency band, which is transmitted/received through the antenna array 430. In a case of transmitting a signal, the RFIC 452 may convert a baseband signal obtained from a communication processor into an RF signal. In the case of receiving a signal, the RFIC 452 may convert an RF signal received through the antenna array 430 into a baseband signal and may provide the baseband signal to the communication processor.

In a case of transmitting a signal, the RFIC 452 may up-convert an IF signal (e.g., approximately 9 GHz to approximately 11 GHz) obtained from an intermediate frequency integrated circuit (IFIC) into an RF signal. In a case of receiving a signal, the RFIC 452 may down-convert an RF signal obtained through the antenna array 430 into an IF signal and may provide the IF signal to the IFIC.

The PMIC 454 may be disposed on another region (e.g., the second surface) of the PCB 410, which is spaced from the antenna array. The PMIC 454 may be supplied with a voltage from a main PCB and may provide power necessary for various components (e.g., the RFIC 452) on an antenna module.

The shielding member 490 may be disposed at a portion (e.g., on the second surface) of the PCB 410 such that at least one of the RFIC 452 or the PMIC 454 is electromagnetically shielded. The shielding member 490 may include a shield can.

The third antenna module 246 may be electrically connected with another PCB (e.g., a main circuit board) through a module interface. The module interface may include a connection member, for example, a coaxial cable connector, a board to board connector, an interposer, or a flexible printed circuit board (FPCB). The RFIC 452 and/or the PMIC 454 of the third antenna module 246 may be electrically connected with the PCB through the connection member.

The third antenna module 246 may be positioned inside the housing of the electronic device 101. The housing may form at least part of the appearance of the electronic device 101. The housing may include a first plate (e.g., the part of the housing constituting at least part of the front surface of the electronic device), a second plate (e.g., the part of the housing constituting at least part of the rear surface of the electronic device 101) facing away from the first plate, and a side member surrounding a space between the first plate and the second plate. For example, the side member may be formed integrally with the second plate. For example, the side member may be coupled with the second plate. At least part of the side member may be used as a conductive radiator for the transmission and reception in a specified frequency. The electronic device may include the display device 160. For example, the display device 160 may be viewable through at least part of the first plate. The third antenna module 246 is described below in greater detail with reference to the accompanying drawings. The third antenna module 246 may be referred to as an antenna structure.

Figure 5:
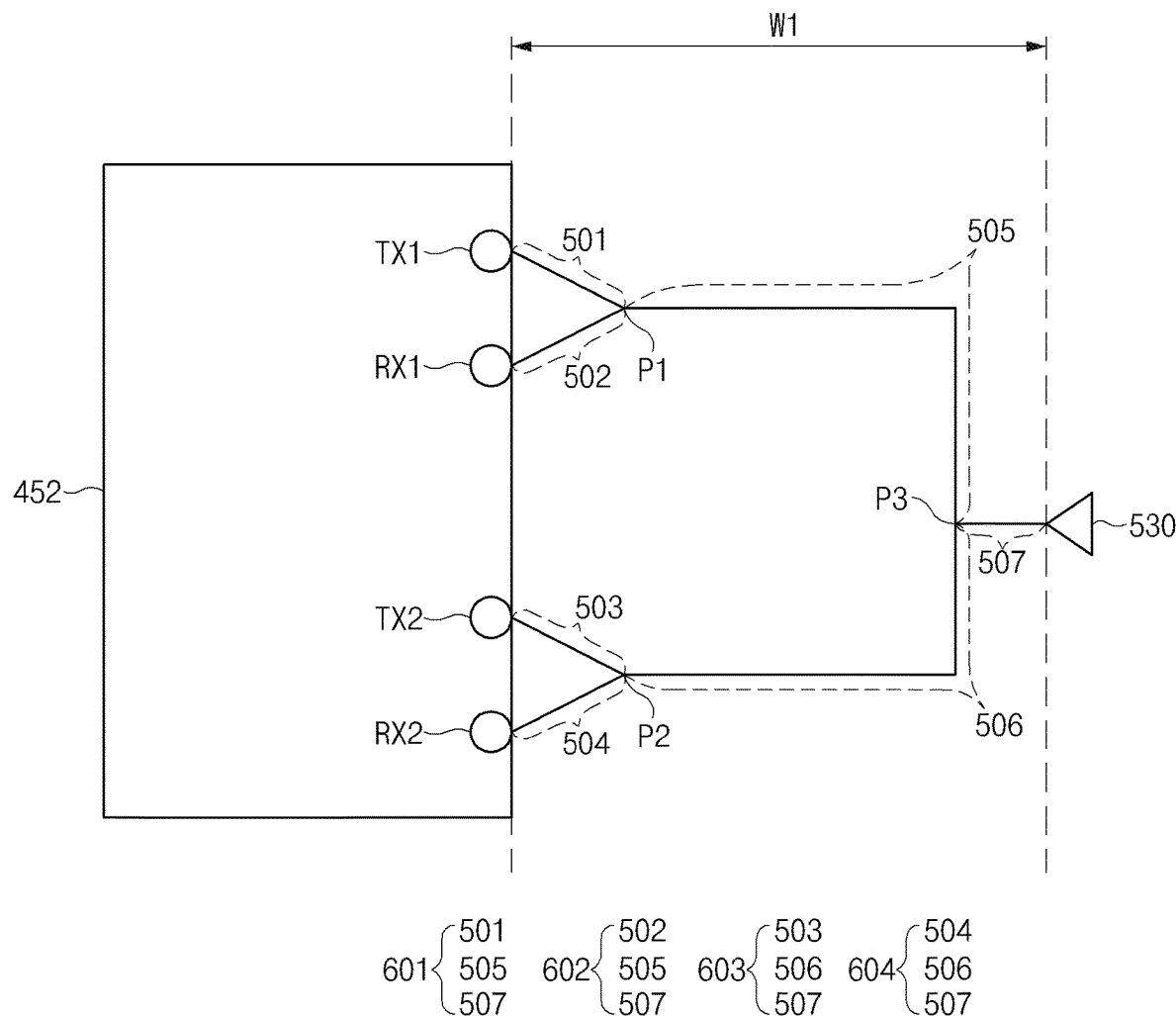
FIG. 5 is a block diagram of a feed network, according to an embodiment.

FIG. 5 is a block diagram of a feed network W1, according to an embodiment.

Referring to FIG. 5, the third antenna module 246 may include an RFIC 452 and a conductive pattern 530. For example, the conductive pattern 530 may correspond to one of the plurality of antenna elements 432, 434, 436, or 438 of FIG. 4. The third antenna module 246 may include a feed network W1 for electrically connecting the RFIC 452 to the conductive pattern 530.

The RFIC 452 may support signal transmission and reception in dual bands. For example, the RFIC 452 may include a first port TX1 and a second port RX1, which are associated with transmission and reception of a signal in a first band. For example, the signal in the first band may have a first wavelength λ1. The RFIC 452 may include a third port TX2 and a fourth port RX2, which are associated with transmission and reception of a signal in a second band different from the first band. For example, the signal in the second band may have a second wavelength λ2. For example, the RFIC 452 may transmit the first signal in the first band, using the first port TX1. The RFIC 452 may receive the second signal in the first band, using the second port RX1. The RFIC 452 may transmit the third signal in the second band, using the third port TX2. The RFIC 452 may receive the fourth signal in the second band, using the fourth port RX2. For example, the RFIC 452 may be referred to as a wireless communication circuit.

The feed network W1 may include a plurality of transmission/reception paths 601, 602, 603, and 604 for electrically connecting the conductive pattern 530 to the RFIC 452. For example, the feed network W1 may include a first node P1, a second node P2, and a third node P3, which are electrically connected to the conductive pattern 530.

For example, the first signal transmission path 601 for transmitting the first signal in the first band may extend between the first port TX1 and the conductive pattern 530. The first signal transmission path 601 may include a first electrical path 501 extending between the first port TX1 and the first node P1 and having a first length L1. For example, the first electrical path 501 may have the first length L1 corresponding to the odd multiple (e.g., 1, 3, 5, . . . ) of ¼ of the wavelength λ1 of the second signal. The first signal transmission path 601 may further include a fifth electrical path 505 extending between the first node P1 and the third node P3 and having a third length L3. For example, the sum of the first length L1 and the third length L3 may have a length corresponding to the odd multiple (e.g., 1, 3, 5, . . . ) of ¼ of the wavelength λ2 of the third signal or the fourth signal in the second band. The first transmission path 601 may include a seventh electrical path 507 extending between the third node P3 and the conductive pattern 530. For example, the seventh electrical path 507 may correspond to the feed part 325.

For example, the second signal reception path 602 for receiving the second signal in the first band may extend between the second port RX1 and the conductive pattern 530. The second signal reception path 602 may include a second electrical path 502 extending between the second port RX1 and the first node P1 and having the first length L1. For example, the second electrical path 502 may have the first length L1 corresponding to the odd multiple (e.g., 1, 3, 5, . . . ) of ¼ of the wavelength λ1 of the first signal. The second signal reception path 602 may further include the fifth electrical path 505 extending between the first node P1 and the third node P3 and having the third length L3. The sum of the first length L1 and the third length L3 may have a length corresponding to the odd multiple (e.g., 1, 3, 5, . . . ) of ¼ of the wavelength λ2 of the third signal or the fourth signal in the second band. The second signal reception path 602 may further include the seventh electrical path 507 extending between the third node P3 and the conductive pattern 530.

For example, the third signal transmission path 603 for transmitting the third signal in the second band may extend between the third port TX2 and the conductive pattern 530. The third signal transmission path 603 may include the third electrical path 503 extending between the third port TX2 and the second node P2 and having the third length L2. For example, the third electrical path 503 may have the length corresponding to the odd multiple (e.g., 1, 3, 5, . . . ) of ¼ of the wavelength λ2 of the fourth signal. The third signal transmission path 603 may include a sixth electrical path 506 extending between the second port P2 and the third node P3 and having the fourth length L4. For example, the sum of the second length L2 and the fourth length L4 may correspond to the odd multiple (e.g., 1, 3, 5, . . . ) of ¼ of the wavelength λ1 of the first signal or the second signal in the first band. The third signal transmission path 603 may include the seventh electrical path 507 extending between the third node P3 and the conductive pattern 530.

For example, the fourth signal reception path 604 for receiving the fourth signal in the second band may extend between the fourth port RX2 and the conductive pattern 530. The fourth signal reception path 604 may include a fourth electrical path 504 extending between the fourth port RX2 and the second node P2 and having the second length L2. For example, the fourth electrical path 504 may have the second length L2 corresponding to the odd multiple (e.g., 1, 3, 5, . . . ) of ¼ of the wavelength λ2 of the third signal in the second band. The fourth signal reception path 604 may further include the sixth electrical path 506 extending between the second node P2 and the third node P3 and having the fourth length L4. For example, the sum of the second length L2 and the fourth length L4 may have a length corresponding to the odd multiple (e.g., 1, 3, 5, . . . ) of ¼ of the wavelength λ1 of the first signal or the second signal. The fourth signal reception path 604 may further include the seventh electrical path 507 extending between the third node P3 and the conductive pattern 530.

The shape of the antenna module illustrated in FIG. 5 is exemplary; as shown in FIG. 4, the antenna module may include a plurality of conductive patterns. In this case, a feed network (e.g., the feed network W1) supporting dual bands may be connected to each of a plurality of conductive patterns.

The antenna module may be included in the electronic device 101. For example, the electronic device 101 may include a housing. The housing may include a first plate, a second plate facing away from the first plate, and a side member surrounding a space between the first plate and the second plate and coupled with the second plate or integrally formed with the second plate. The electronic device 101 may include the display device 160 exposed through at least part of the first plate.

The RFIC 452 may open an electrical path connected to the corresponding port by short circuiting or shorting a port not used for transmission or reception. For example, when the RFIC 452 shorts one port by connecting the port to the ground, when viewed from the conductive pattern 530, the electrical path connected to the corresponding port may operate in a state substantially the same as the opened state. Accordingly, the RFIC 452 may connect an arbitrary path to the conductive pattern 530 or may open the arbitrary path from the conductive pattern 530, without using a switch element for selecting a transmission/reception path of a signal in the first band or the second band connected to the conductive pattern 530, a switch element for selecting the transmission or reception path of a signal in the first band, and a switch element for selecting the transmission or reception path of a signal in the second band. Hereinafter, signal transmitting/receiving methods using each of the transmission/reception paths are described in greater detail with reference to FIGS. 6 to 9.

Figure 6:
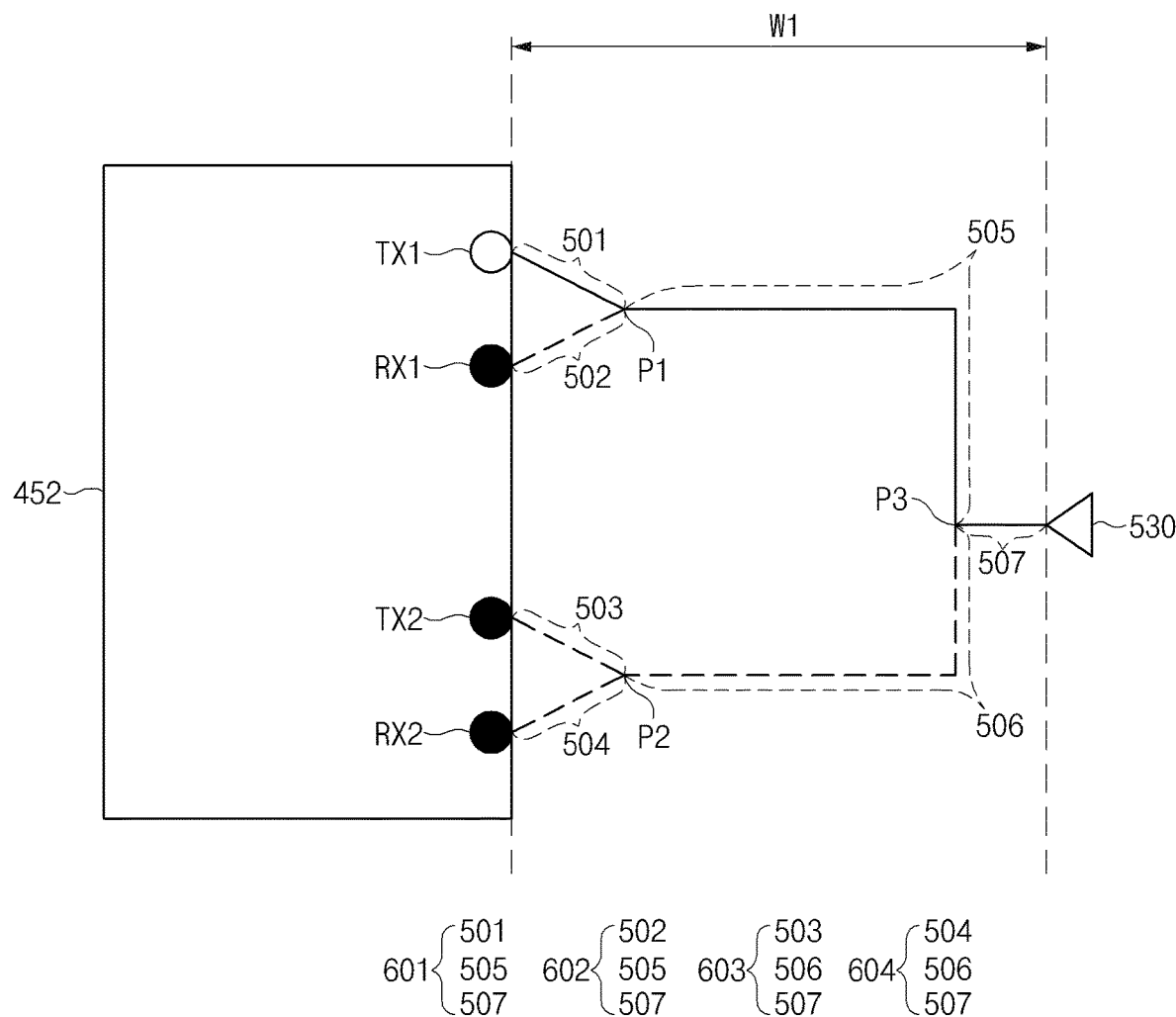
FIG. 6 is a block diagram of a feed network for transmitting a signal in a first band, according to an embodiment.

FIG. 6 is a block diagram of a feed network for transmitting a signal in a first band, according to an embodiment.

Referring to FIG. 6, the RFIC 452 may be configured to transmit the first signal in the first band. The RFIC 452 may connect the remaining ports RX1, TX2, and RX2 to ground other than the first port TX1 for transmitting the first signal. The RFIC 452 may feed the first signal to the conductive pattern 530 via the first signal transmission path 601.

Since the second port RX1 is shorted and the length of the second electrical path 502 between the first node P1 and the second port RX1 corresponds to the first length L1 corresponding to the odd multiple of ¼ of the first wavelength λ1 of the first signal, the second electrical path 502 may operate to be substantially the same as the opened state for a signal of a first wavelength. For example, the second signal reception path 602 may be regarded as being opened, due to the opening of the second electrical path 502.

Since the third port TX2 is shorted and the sum of the fourth length L4 of the sixth electrical path 506 between the second node P2 and the third node P3 and the second length L2 of the third electrical path 503 between the third port TX2 and the second node P2 corresponds to the odd multiple of ¼ of the first wavelength λ1 of the first signal, the third signal transmission path 603 may operate to be substantially the same as the opened state.

Since the fourth port RX2 is shorted and the sum of the fourth length L4 of the sixth electrical path 506 between the second node P2 and the third node P3 and the second length L2 of the fourth electrical path 504 between the fourth port TX4 and the second node P2 corresponds to the odd multiple of ¼ of the first wavelength λ1 of the first signal, the fourth signal transmission path 604 may operate to be substantially the same as the opened state.

In this case, only the first signal transmission path 601 may operate as an electrical path connected between the conductive pattern 530 and the RFIC 452.

Figure 7:
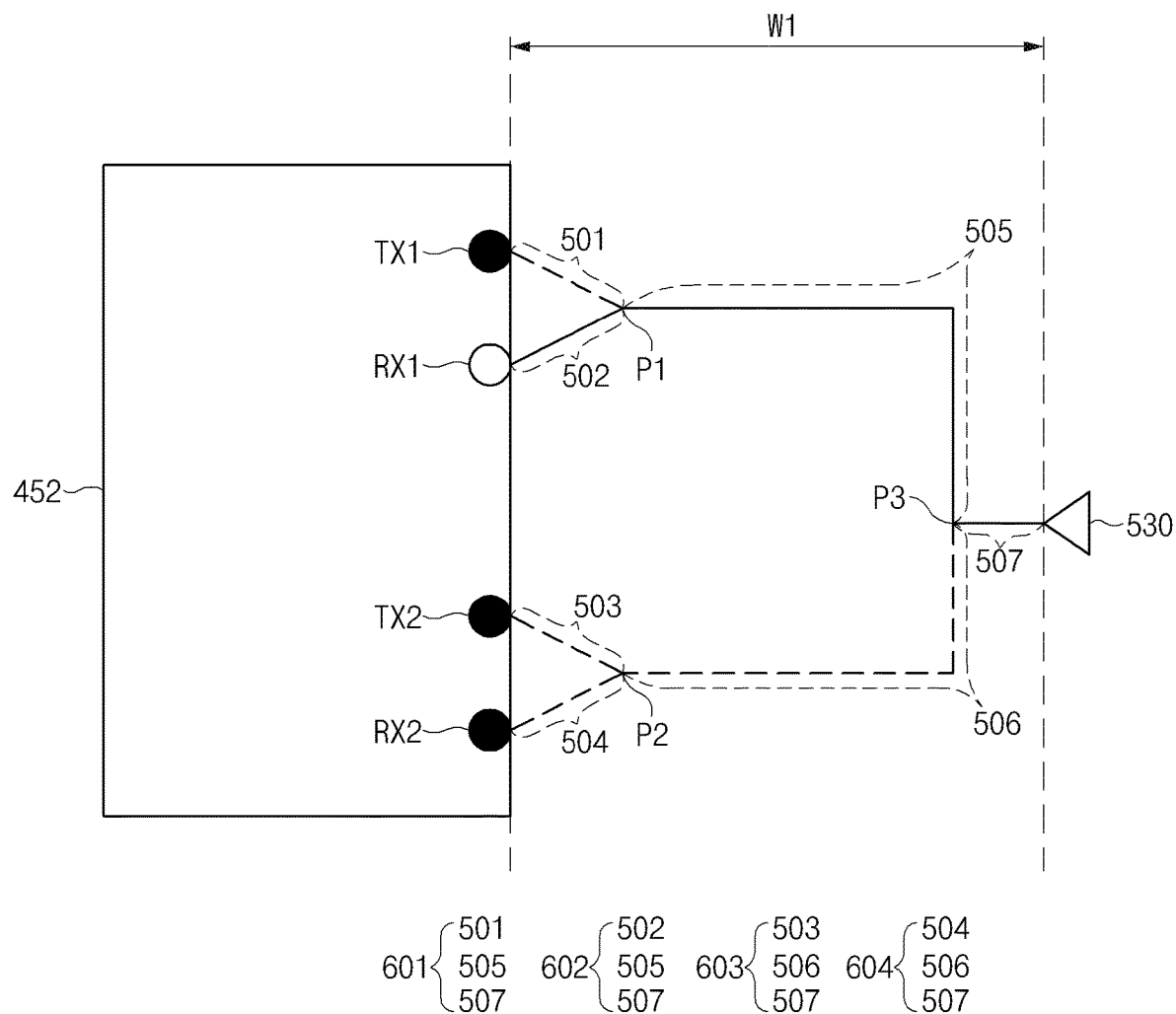
FIG. 7 is a block diagram of a feed network for receiving a signal in a first band, according to an embodiment.

FIG. 7 is a block diagram of a feed network for receiving a signal in a first band, according to an embodiment.

Referring to FIG. 7, the RFIC 452 may be configured to receive the second signal in the first band. The RFIC 452 may connect the remaining ports TX1, TX2, and RX2 to ground other than the second port RX1 for receiving the second signal. The RFIC 452 may receive the second signal from the conductive pattern 530 through the second signal reception path 602.

Since the first port TX1 is shorted and the length of the first electrical path 501 between the first node P1 and the first port TX1 corresponds to the first length L1 corresponding to the odd multiple of ¼ of the first wavelength λ1 of the second signal, the first electrical path 501 may operate to be substantially the same as the opened state for a signal of a first wavelength. For example, the first signal transmission path 601 may operate to be substantially the same as the opened state, due to the opening of the first electrical path 501.

Since the third port TX2 and the fourth port RX2 are shorted and the sum of the second length L2 and the fourth length L4 of the sixth electrical path 506 between the second node P2 and the third node P3 corresponds to the odd multiple of ¼ of the first wavelength λ1 of the first signal, the third signal transmission path 603 and the fourth signal reception path 604 may operate to be substantially the same as the opened state.

Accordingly, in this case, only the second signal reception path 602 may operate as an electrical path connected between the conductive pattern 530 and the RFIC 452.

Figure 8:
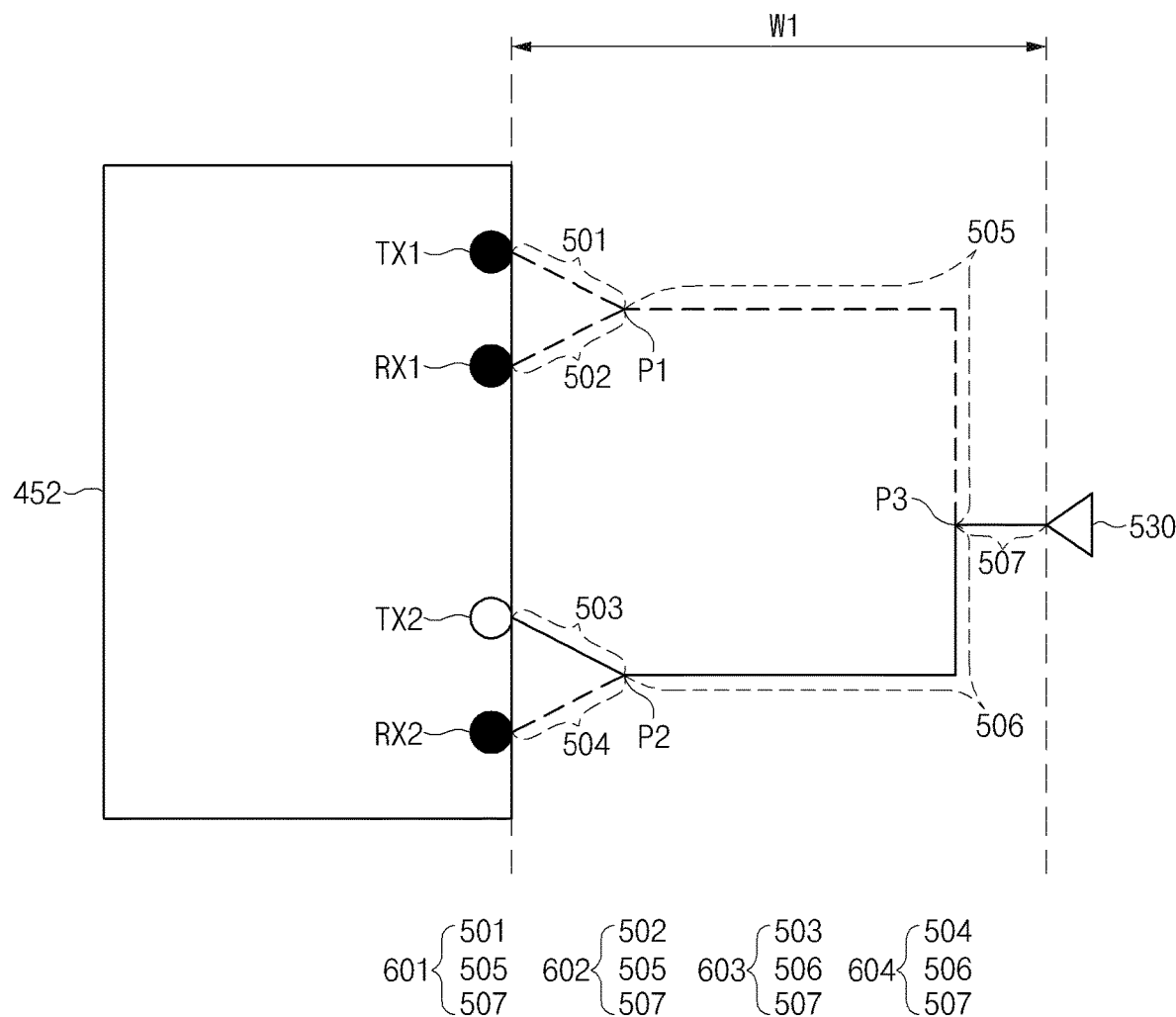
FIG. 8 is a block diagram of a feed network for transmitting a signal in a second band, according to an embodiment.

FIG. 8 is a block diagram of a feed network for transmission in a second band, according to an embodiment.

Referring to FIG. 8, the RFIC 452 may be configured to transmit the third signal in the second band. The RFIC 452 may connect the remaining ports TX1, RX1, and RX2 to ground other than the third port TX2 for transmitting the third signal. The RFIC 452 may feed the third signal to the conductive pattern 530 via the third signal transmission path 603.

Since the first port TX1 and the second port RX1 are shorted and the sum of the first length L1 and the third length L3 of the fifth electrical path 505 between the first node P1 and the third node P3 corresponds to the odd multiple of ¼ of the second wavelength λ2 of the third signal, the first signal transmission path 601 and the second signal reception path 602 may operate to be substantially the same as the opened state.

Since the fourth port RX2 is shorted and the length of the fourth electrical path 504 between the second node P2 and the second port RX2 corresponds to the second length L2 corresponding to the odd multiple of ¼ of the second wavelength λ2 of the third signal, the fourth electrical path 504 may operate to be substantially the same as the opened state for a signal of a second wavelength. For example, the fourth signal reception path 604 may operate to be substantially the same as the opened state, due to the opening of the fourth electrical path 504.

Accordingly, in this case, only the third signal transmission path 603 may operate as an electrical path connected between the conductive pattern 530 and the RFIC 452.

Figure 9:
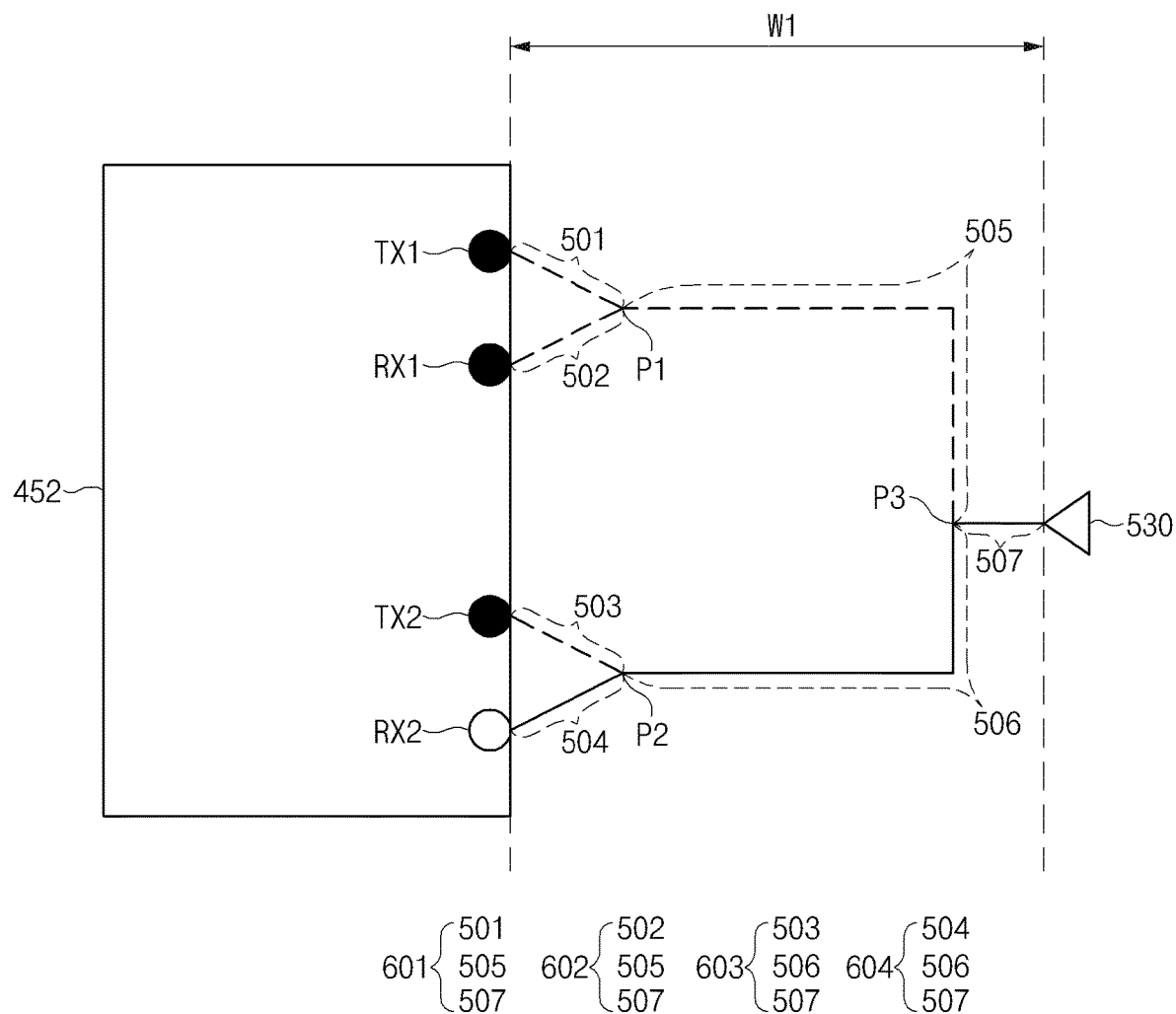
FIG. 9 is a block diagram of a feed network for receiving a signal in a second band, according to an embodiment.

FIG. 9 is a block diagram of a feed network for receiving a signal in a second band, according to an embodiment.

Referring to FIG. 9, the RFIC 452 may be configured to receive the fourth signal in the second band. According to an embodiment, the RFIC 452 may connect the remaining ports TX1, RX1, and TX2 to ground other than the second port RX2 for receiving the fourth signal. The RFIC 452 may receive the fourth signal from the conductive pattern 530 through the fourth signal reception path 604.

Since the first port TX1 and the second port RX1 are shorted and the sum of the first length L1 and the third length L3 of the fifth electrical path 505 between the first node P1 and the third node P3 corresponds to the odd multiple of ¼ of the second wavelength λ2 of the fourth signal, the first signal transmission path 601 and the second signal reception path 602 may operate to be substantially the same as the opened state.

Since the third port TX2 is shorted and the length of the third electrical path 503 between the second node P2 and the third port TX2 corresponds to the second length L2 corresponding to the odd multiple of ¼ of the second wavelength of the fourth signal, the third electrical path 503 may operate to be substantially the same as the opened state for a signal of a second wavelength. For example, the third signal transmission path 603 may operate to be substantially the same as the opened state, due to the opening of the third electrical path 503.

Accordingly, in this case, only the fourth signal reception path 604 may operate as an electrical path connected between the conductive pattern 530 and the RFIC 452.

Figure 10:
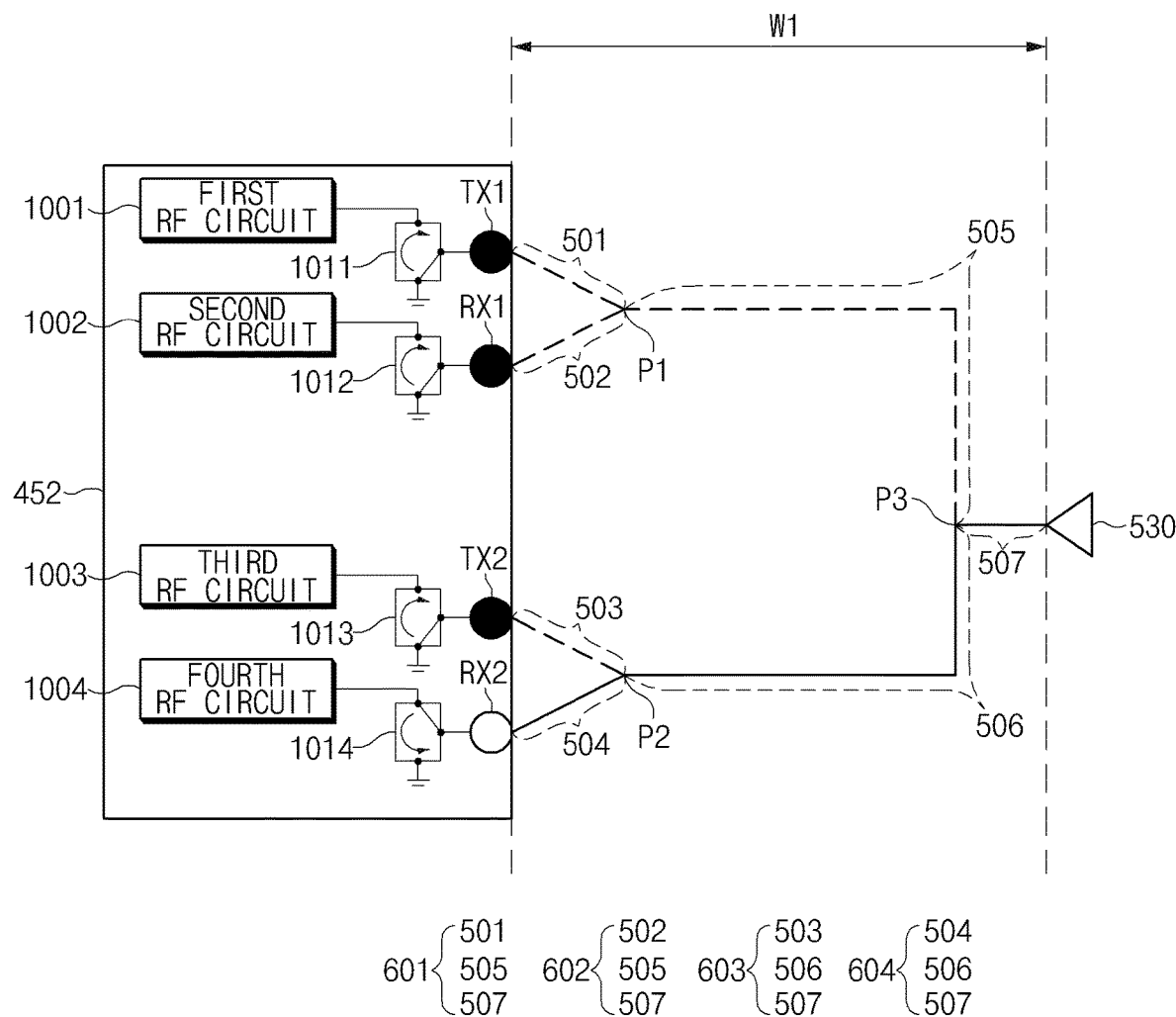
FIG. 10 is a block diagram of a radio frequency integrated circuit (RFIC), according to an embodiment.

FIG. 10 is a block diagram of an RFIC, according to an embodiment.

Referring to FIG. 10, the RFIC 452 may include at least one switch for selectively connecting to each of the first port TX1, the second port RX1, the third port TX2, and the fourth port RX2. For example, the RFIC 452 may include a first switch 1011 for selectively connecting the first signal transmission path 601 to a first RF circuit 1001 or ground, a second switch 1012 for selectively connecting the second signal reception path 602 to a second RF circuit 1002 or the ground, a third switch 1013 for selectively connecting the third signal transmission path 603 to a third RF circuit 1003 or the ground, and/or a fourth switch 1014 for selectively connecting the fourth signal reception path 604 to a fourth RF circuit 1004 or the ground. For example, the first RF circuit 1001, the second RF circuit 1002, the third RF circuit 1003, and/or the fourth RF circuit 1004 may include an amplifier for amplifying a signal and/or a phase shifter. For example, the amplifiers of the first RF circuit 1001 and the second RF circuit 1002 may have linearity in a frequency band corresponding to the first frequency band. The amplifiers of the third RF circuit 1003 and the fourth RF circuit 1004 may have linearity in a frequency band corresponding to the second frequency band.

The RFIC 452 may receive the fourth signal, using the fourth port RX2. For example, the RFIC 452 may control the fourth switch 1014 to connect the fourth port RX2 to the fourth RF circuit 1004. For example, the RFIC 452 may connect the remaining ports to the ground, using the first switch 1011, the second switch 1012, and the third switch 1013. As described above with reference to FIG. 9, in this case, the remaining signal transmission/reception paths 601, 602, and 603 other than the fourth signal reception path 604 may operate to be substantially the same as the opened state.

Figure 11:
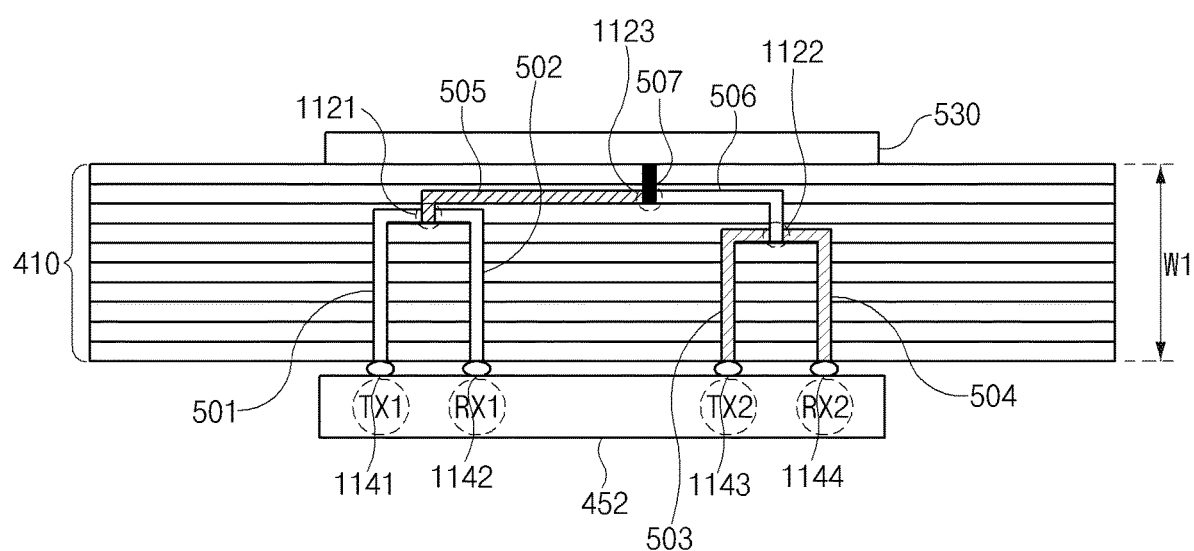
FIG. 11 is an illustration of a feed network of an antenna module, according to an embodiment.

FIG. 11 is an illustration of a feed network of an antenna module, according to an embodiment.

Referring to FIG. 11, an antenna module may include the PCB 410, the conductive pattern 530, and the RFIC 452. For example, the PCB 410 may include a first surface, on which the conductive pattern 530 is formed, and a second surface facing away from the first surface. For example, the RFIC 452 may be positioned on the second surface. The PCB 410 may be formed of a plurality of layers. For example, the PCB 410 may include the feed network W1, which is formed through the plurality of layers of the PCB 410 and which electrically connects the RFIC 452 to the conductive pattern 530. For example, the antenna module may include an antenna structure including the feed network W1 and the conductive pattern 530. The antenna module may include the RFIC 452 and the antenna structure.

The first port TX1 of the RFIC 452 may be connected to the first electrical path 501 through a first connection part 1141. The second port RX1 may be connected to the second electrical path 502 through a second connection part 1142. The third port TX2 may be connected to the third electrical path 503 through a third connection part 1143. The fourth port RX2 may be connected to the fourth electrical path 504 through a fourth connection part 1144.

The RFIC 452 may transmit a first signal having a first frequency and a first wavelength λ1, using the first port TX1 and may receive a second signal having the first frequency and the first wavelength λ1, using the second port RX1. The RFIC 452 may transmit a third signal having a second frequency and a second wavelength λ2, using the third port TX2 and may receive a fourth signal having the second frequency and the second wavelength λ2, using the fourth port RX2.

For example, the first electrical path 501 may extend between the first port TX1 and the first node 1121 and may have a first length L1. The second electrical path 502 may extend between the second port RX1 and the first node 1121 and may have the first length L1. The fifth electrical path 505 may extend between the first node 1121 and the third node 1123 and may have a third length L3. The seventh electrical path 507 may extend between the third node 1123 and the conductive pattern 530. For example, the seventh electrical path 507 may correspond to the feed part 325.

For example, the first length L1 may correspond to the odd multiple of ¼ of the first wavelength λ1 of the first signal or the second signal; the second length L2 may correspond to the odd multiple ¼ of the second wavelength λ2 of the third signal or the fourth signal. According to an embodiment, the sum of the first length L1 and the third length L3 may correspond to the odd multiple of ¼ of the second wavelength λ2 of the third signal or the fourth signal. The sum of the second length L2 and the fourth length L4 may correspond to the odd multiple of ¼ of the first wavelength λ1 of the first signal or the second signal.

For example, the third electrical path 503 may extend between the third port TX2 and the second node 1122 and may have the second length L2. The fourth electrical path 504 may extend between the fourth port RX2 and the second node 1122 and may have the second length L2. The sixth electrical path 506 may extend between the second node 1122 and the third node 1123 and may have the fourth length L4. The seventh electrical path 507 may extend between the third node 1123 and the conductive pattern 530.

Each of the first electrical path 501, the second electrical path 502, the third electrical path 503, and the fourth electrical path 504 may be selectively connected to the ground through at least one switch. For example, at least one switch may be a switch included in the RFIC 452. The RFIC 452 may be configured to connect the remaining electrical paths other than the electrical path used for transmission or reception among the first electrical path 501, the second electrical path 502, the third electrical path 503, and the fourth electrical path 504, to the ground through at least one switch.

Each of the first electrical path 501, the second electrical path 502, the third electrical path 503, and the fourth electrical path 504 may be formed through a plurality of layers of the PCB 410. For example, the numbers of layers associated with the first electrical path 501 and the second electrical path 502 may be the same as each other. For example, the numbers of layers associated with the third electrical path 503 and the fourth electrical path 504 may be the same as each other. For example, the numbers of layers associated with the first electrical path 501 and the third electrical path 503 may be different from each other.

The first node 1121 and the second node 1122 may be positioned at different layers. For example, the first node 1121 may be positioned on a layer more adjacent to the conductive pattern 530 than the second node 1122. However, the present disclosure is not intended to be limited thereto. For example, the first node 1121 and the second node 1122 may be positioned on the same layer. For example, the second node 1122 may be positioned on a layer more adjacent to the conductive pattern 530 than the first node 1121.

The third node 1123 may be positioned on a layer more adjacent to the conductive pattern 530 than the first node 1121 and the second node 1122. For example, the third node 1123 may be positioned on the same layer as a ground layer.

The third node 1123 may be positioned to be more adjacent to the second node 1122 than the first node 1121.

Figure 12:
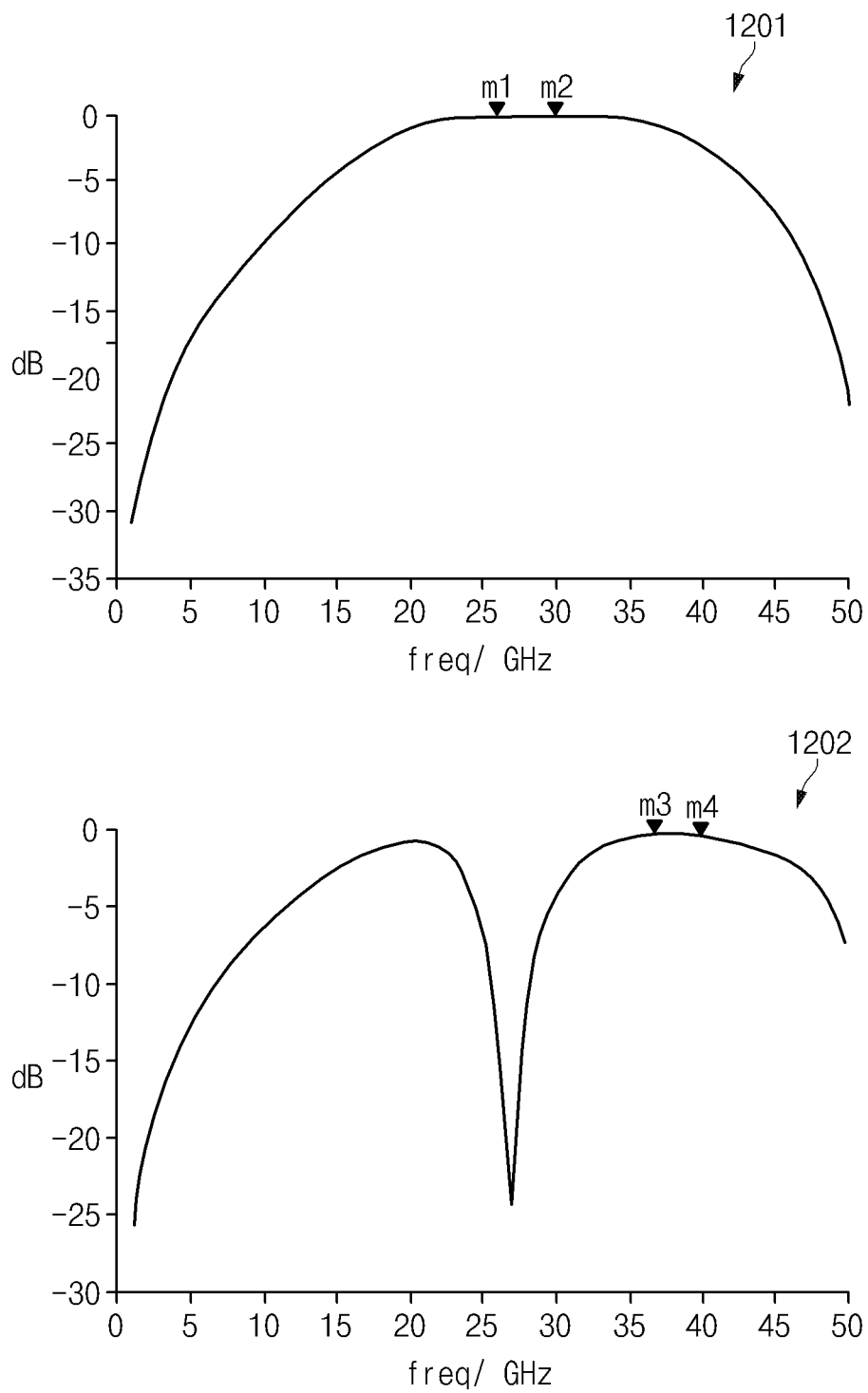
FIG. 12 illustrates charts of response characteristics of an antenna module, according to an embodiment.
Figure 13:
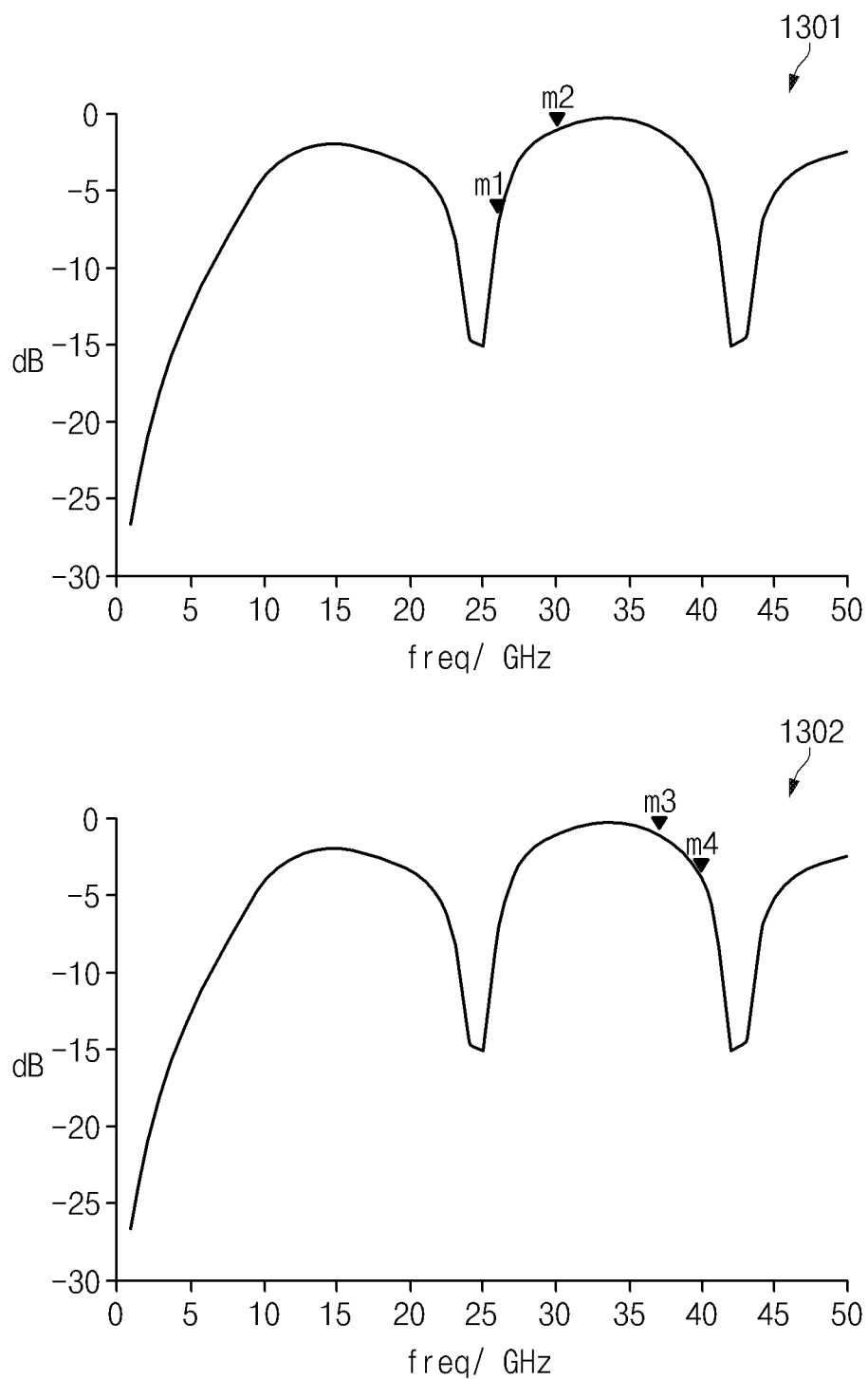
FIG. 13 illustrates charts of response characteristics of an antenna module, according to an embodiment.

FIG. 12 illustrates charts of response characteristics of an antenna module, according to an embodiment.

Referring to FIG. 12, a simulation result of an antenna module designed according to embodiments of the disclosure are illustrated.

A signal response characteristic 1202 of a first signal transmission path of the antenna module is illustrated. In the response curve 1201, m1 indicates a point at 26 GHz, and m2 indicates a point at 30 GHz. The antenna module may have a loss of between about 0.3 dB and about 0.4 dB in the first band.

A signal response characteristic 1202 of the third signal transmission path of the antenna module is illustrated. In the response curve 1202, m3 indicates a point at 37 GHz, and m4 indicates a point at 40 GHz. The antenna module may have a loss of between about 0.2 dB and about 0.3 dB in the second band.

According to an embodiment, an electronic device may include a housing including a first plate (e.g., a cover plate), a second plate (e.g., a rear plate) facing away from the first plate, and a side member (e.g., a side bezel structure) surrounding a space between the first plate and the second plate and coupled with the second plate or integrally formed with the second plate. The electronic device may include a display exposed through at least part of the first plate and a wireless communication circuit including a first port, a second port, a third port, and a fourth port. The wireless communication circuit may include a first port TX1, a second port RX1, a third port TX2, and a fourth port RX2. The wireless communication circuit may be configured to transmit a first signal having a first frequency via the first port, to receive a second signal having the first frequency via the second port, to transmit a third signal having a second frequency different from the first frequency via the third port, and to receive a fourth signal having the second frequency via the fourth port. The antenna structure disposed inside the housing may include a conductive pattern and a first node P1, a second node P2, and a third node P3, which are electrically connected to the conductive pattern. The antenna structure may include the first electrical path 501 extending between the first port and the first node and having a first length that is an odd multiple of ¼ of a first wavelength of the first signal, a second electrical path extending between the second port and the first node and having the first length, a third electrical path extending between the third port and the second node and having a second length that is an odd multiple of ¼ of a second wavelength of the second signal, a fourth electrical path extending between the fourth port and the second node and having the second length, a fifth electrical path extending between the first node and the third node and having a third length, wherein a sum of the first length and the third length is an odd multiple of ¼ of the second wavelength, a sixth electrical path extending between the second node and the third node and having a fourth length, wherein a sum of the second length and the fourth length is an odd multiple of ¼ of the first wavelength, and a seventh electrical path electrically connected between the third node and the conductive pattern.

Each of the first electrical path, the second electrical path, the third electrical path, and the fourth electrical path may be selectively connected to the ground through at least one switch. For example, the at least one switch may be included in the wireless communication circuit.

The wireless communication circuit may be configured to connect remaining electrical paths other than an electrical path used for transmission or reception among the first electrical path, the second electrical path, the third electrical path, and the fourth electrical path, to the ground through the at least one switch.

The antenna structure may include a printed circuit board including a first surface, on which the conductive pattern is formed, and a second surface facing away from the first surface. The PCB may include a plurality of layers. The wireless communication circuit may be positioned on the second surface of the PCB.

Each of the first electrical path, the second electrical path, the third electrical path, the fourth electrical path, the fifth electrical path, the sixth electrical path, and the seventh electrical path may be formed through at least one layer of the plurality of layers of the PCB. For example, the first node and the second node may be positioned on different layers from each other among the plurality of layers. For example, the third node may be positioned on a layer more adjacent to the conductive pattern among the plurality of layers than the first node and the second node. For example, the antenna structure may include a plurality of conductive patterns. For example, the first frequency may be not greater than 30 GHz. The second frequency may exceed 30 GHz.

According to an embodiment, an antenna module may include a wireless communication circuit including a first port, a second port, a third port, and a fourth port. The wireless communication circuit may be configured to transmit a first signal having a first frequency via the first port, receive a second signal having the first frequency via the second port, transmit a third signal having a second frequency different from the first frequency via the third port, and receive a fourth signal having the second frequency via the fourth port. The antenna module may further include a PCB in which a conductive pattern is formed on a first surface and in which the wireless communication circuit is positioned on a second surface facing away from the first surface. The PCB may include a first node, a second node, and a third node electrically connected to the conductive pattern. The PCB may include a first electrical path extending between the first port and the first node and having a first length that is an odd multiple of ¼ of a first wavelength of the first signal, a second electrical path extending between the second port and the first node and having the first length, a third electrical path extending between the third port and the second node and having a second length that is an odd multiple of ¼ of a second wavelength of the second signal, a fourth electrical path extending between the fourth port and the second node and having the second length, a fifth electrical path extending between the first node and the third node and having a third length, wherein a sum of the first length and the third length is an odd multiple of ¼ of the second wavelength, a sixth electrical path extending between the second node and the third node and having a fourth length, wherein a sum of the second length and the fourth length is an odd multiple of ¼ of the first wavelength, and a seventh electrical path electrically connected between the third node and the conductive pattern.

Each of the first electrical path, the second electrical path, the third electrical path, and the fourth electrical path is selectively connected to a ground through at least one switch. For example, the at least one switch may be included in the wireless communication circuit. The wireless communication circuit may be configured to connect remaining electrical paths other than an electrical path used for transmission or reception among the first electrical path, the second electrical path, the third electrical path, and the fourth electrical path, to the ground through the at least one switch.

The wireless communication circuit may include a first communication circuit for transmitting the first signal, a second communication circuit for receiving the second signal, a third communication circuit for transmitting the third signal, and a fourth communication circuit for receiving the fourth signal. The wireless communication circuit may be configured to selectively connect the first electrical path to the first communication circuit or the ground, to selectively connect the second electrical path to the second communication circuit or the ground, to selectively connect the third electrical path to the third communication circuit or the ground, and to selectively connect the fourth electrical path to the fourth communication circuit or the ground, using the at least one switch.

Each of the first electrical path, the second electrical path, the third electrical path, the fourth electrical path, the fifth electrical path, the sixth electrical path, and the seventh electrical path may be formed through at least one layer of the plurality of layers of the PCB.

For example, the first node and the second node may be positioned on different layers from each other among the plurality of layers. For example, the third node may be positioned on a layer more adjacent to the conductive pattern among the plurality of layers than the first node and the second node.

The antenna module may further include a plurality of conductive patterns disposed on the first surface. Each of the plurality of conductive patterns may include a plurality of electrical paths, each of which respectively connects a plurality of ports of the wireless communication circuit to the plurality of conductive patterns. A configuration of the plurality of ports and the electrical paths may be substantially the same as the first port, the second port, the third port, the fourth port, the first electrical path, the second electrical path, the third electrical path, the fourth electrical path, the fifth electrical path, the sixth electrical path, and the seventh electrical path.

An electronic device may include an antenna module supporting dual bands capable of securing the specified antenna performance.

An antenna module having the improved linearity may be provided.

An antenna module capable of minimizing internal loss may be provided.

In addition, a variety of effects directly or indirectly understood through the disclosure may be provided.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device, comprising:
   a housing comprising a first plate, a second plate facing away from the first plate, and a side member surrounding a space between the first plate and the second plate and coupled with the second plate or integrally formed with the second plate;
   a display exposed through at least part of the first plate;
   a wireless communication circuit comprising a first port, a second port, a third port, and a fourth port, wherein the wireless communication circuit is configured to:
      transmit a first signal having a first frequency via the first port;
      receive a second signal having the first frequency via the second port;
      transmit a third signal having a second frequency different from the first frequency via the third port; and
      receive a fourth signal having the second frequency via the fourth port; and
   an antenna structure disposed inside the housing, wherein the antenna structure comprises:
      a conductive pattern;
      a first node, a second node, and a third node electrically connected to the conductive pattern;
      a first electrical path extending between the first port and the first node and having a first length that is an odd multiple of ¼ of a first wavelength of the first signal;
      a second electrical path extending between the second port and the first node and having the first length;
      a third electrical path extending between the third port and the second node and having a second length that is an odd multiple of ¼ of a second wavelength of the second signal;
      a fourth electrical path extending between the fourth port and the second node and having the second length;
      a fifth electrical path extending between the first node and the third node and having a third length, wherein a sum of the first length and the third length is an odd multiple of ¼ of the second wavelength;
      a sixth electrical path extending between the second node and the third node and having a fourth length, wherein a sum of the second length and the fourth length is an odd multiple of ¼ of the first wavelength; and
      a seventh electrical path electrically connected between the third node and the conductive pattern.

2. The electronic device of claim 1, wherein each of the first electrical path, the second electrical path, the third electrical path, and the fourth electrical path is selectively connected to a ground through at least one switch.

3. The electronic device of claim 2, wherein the at least one switch is included in the wireless communication circuit.

4. The electronic device of claim 3, wherein the wireless communication circuit is further configured to connect remaining electrical paths other than an electrical path used for transmission or reception among the first electrical path, the second electrical path, the third electrical path, and the fourth electrical path, to the ground through the at least one switch.

5. The electronic device of claim 1, wherein the antenna structure includes a printed circuit board including a first surface, on which the conductive pattern is formed, and a second surface facing away from the first surface,
   wherein the printed circuit board comprises a plurality of layers, and
   wherein the wireless communication circuit is positioned on the second surface of the printed circuit board.

6. The electronic device of claim 5, wherein each of the first electrical path, the second electrical path, the third electrical path, the fourth electrical path, the fifth electrical path, the sixth electrical path, and the seventh electrical path is formed through at least one layer of the plurality of layers of the printed circuit board.

7. The electronic device of claim 6, wherein the first node and the second node are positioned on different layers from each other among the plurality of layers.

8. The electronic device of claim 7, wherein the third node is positioned on a layer more adjacent to the conductive pattern among the plurality of layers than the first node and the second node.

9. The electronic device of claim 1, wherein the antenna structure further comprises a plurality of conductive patterns.

10. The electronic device of claim 1, wherein the first frequency is not greater than 30 GHz, and
wherein the second frequency exceeds 30 GHz.

11. An antenna module, comprising:
a wireless communication circuit comprising a first port, a second port, a third port, and a fourth port, wherein the wireless communication circuit is configured to:
transmit a first signal having a first frequency via the first port;
receive a second signal having the first frequency via the second port;
transmit a third signal having a second frequency different from the first frequency via the third port; and
receive a fourth signal having the second frequency via the fourth port; and
a printed circuit board in which a conductive pattern is formed on a first surface and in which the wireless communication circuit is positioned on a second surface facing away from the first surface, wherein the printed circuit board comprises:
a first node, a second node, and a third node electrically connected to the conductive pattern;
a first electrical path extending between the first port and the first node and having a first length that is an odd multiple of ¼ wavelength of a first wavelength of the first signal;
a second electrical path extending between the second port and the first node and having the first length;
a third electrical path extending between the third port and the second node and having a second length that is an odd multiple of ¼ wavelength of a second wavelength of the second signal;
a fourth electrical path extending between the fourth port and the second node and having the second length;
a fifth electrical path extending between the first node and the third node and having a third length, wherein a sum of the first length and the third length is an odd multiple of ¼ wavelength of the second wavelength;
a sixth electrical path extending between the second node and the third node and having a fourth length, wherein a sum of the second length and the fourth length is an odd multiple of ¼ wavelength of the first wavelength; and
a seventh electrical path electrically connected between the third node and the conductive pattern.

12. The antenna module of claim 11, wherein each of the first electrical path, the second electrical path, the third electrical path, and the fourth electrical path is selectively connected to a ground through at least one switch.

13. The antenna module of claim 12, wherein the at least one switch is included in the wireless communication circuit.

14. The antenna module of claim 13, wherein the wireless communication circuit is further configured to connect remaining electrical paths other than an electrical path used for transmission or reception among the first electrical path, the second electrical path, the third electrical path, and the fourth electrical path, to the ground through the at least one switch.

15. The antenna module of claim 12, wherein the wireless communication circuit further comprises a first communication circuit for transmitting the first signal, a second communication circuit for receiving the second signal, a third communication circuit for transmitting the third signal, and a fourth communication circuit for receiving the fourth signal, and
wherein, using the at least one switch, the wireless communication circuit is further configured to:
selectively connect the first electrical path to the first communication circuit or the ground;
selectively connect the second electrical path to the second communication circuit or the ground;
selectively connect the third electrical path to the third communication circuit or the ground; and
selectively connect the fourth electrical path to the fourth communication circuit or the ground.

16. The antenna module of claim 11, wherein each of the first electrical path, the second electrical path, the third electrical path, the fourth electrical path, the fifth electrical path, the sixth electrical path, and the seventh electrical path is formed through at least one layer of a plurality of layers of the printed circuit board.

17. The antenna module of claim 16, wherein the first node and the second node are positioned on different layers from each other among the plurality of layers.

18. The antenna module of claim 16, wherein the third node is positioned on a layer more adjacent to the conductive pattern among the plurality of layers than the first node and the second node.

19. The antenna module of claim 11, further comprising:
a plurality of conductive patterns disposed on the first surface,
wherein each of the plurality of conductive patterns comprises a plurality of electrical paths, each of which connects a plurality of ports of the wireless communication circuit to the plurality of conductive patterns, respectively, and
wherein the plurality of ports and the electrical paths are configured to be substantially same as the first port, the second port, the third port, the fourth port, the first electrical path, the second electrical path, the third electrical path, the fourth electrical path, the fifth electrical path, the sixth electrical path, and the seventh electrical path.

20. The antenna module of claim 11, wherein the first frequency is not greater than 30 GHz, and
wherein the second frequency exceeds 30 GHz.

* * * * *